(12) United States Patent
Zhou et al.

(10) Patent No.: US 8,829,735 B2
(45) Date of Patent: Sep. 9, 2014

(54) LOW FREQUENCY RESTORATION

(75) Inventors: Dacheng Zhou, Fort Collins, CO (US); Daniel Alan Berkram, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 895 days.

(21) Appl. No.: 13/016,850

(22) Filed: Jan. 28, 2011

(65) Prior Publication Data
US 2012/0194001 A1 Aug. 2, 2012

(51) Int. Cl.
H03K 3/00 (2006.01)
H03K 3/64 (2006.01)
H04L 25/02 (2006.01)

(52) U.S. Cl.
CPC ................... *H04L 25/0272* (2013.01)
USPC .......................................................... 307/106

(58) Field of Classification Search
USPC .................................................. 307/106, 152
See application file for complete search history.

(56) References Cited

U.S. PATENT DOCUMENTS

| 6,545,541 | B2 | 4/2003 | Pehlke et al. |
| 7,208,937 | B2 | 4/2007 | Conner |
| 7,245,144 | B1 | 7/2007 | Wong et al. |
| 7,436,216 | B1 | 10/2008 | Brunn et al. |
| 7,620,121 | B1 | 11/2009 | Tetzlaff et al. |
| 7,649,409 | B1 | 1/2010 | Koh et al. |
| 2008/0057900 | A1* | 3/2008 | Fang et al. .................... 455/296 |
| 2008/0063091 | A1 | 3/2008 | Dong et al. |

OTHER PUBLICATIONS

Fang, Emerson, et al., "A 5.2Gbps HyperTransportTM Integrated AC Coupled Receiver with DFR DC Restore" VLSI Circuits, 2007 IEEE.

* cited by examiner

*Primary Examiner* — Carlos Amaya

(57) ABSTRACT

Low frequency components are removed from an input signal, and transitions in the input signal are detected at a receiver input. A feedback loop restores the low frequency components at the input of the receiver.

15 Claims, 3 Drawing Sheets

LOW FREQUENCY RESTORATION

BACKGROUND

In the art of computing, differential signaling is often used to transmit data. Typically, two complementary signals are sent on two separate wires such that when one signal transitions from low to high, the other signal transitions from high to low. Differential signaling tends to provide greater immunity to noise, and reduces detection issues caused by variations in common mode components.

Several standards used in the art of computing specify differential signaling. For example, the Peripheral Component Interconnect Express (PCIe) standard transmits data via lanes. A lane comprises a transmit and receive pair of differential lines. Accordingly, each lane is composed of four wires, with data traveling in one direction upon each set of differential wires. The PCIe standard specifies AC coupling at the input circuit, with a high-pass filter allowing high-frequency components to pass to a receiver, while filtering out low frequency components. Often the high-pass filter is implemented by coupling capacitors. PCIe version 1.0a specifies a data rate of 2.5 Gbps with a maximum fundamental clock frequency of 1.25 GHz, PCIe version 2.0 specifies a data rate of 5 Gbps with a maximum fundamental clock frequency of 2.5 GHz, and PCIe version 3.0 specifies a data rate of 8 Gbps with a maximum fundamental clock frequency of 4 GHz.

Another standard used in the art of computing is the Intel® QuickPath Interconnect (QPI) standard. QPI interconnects are typically used to couple processors to each other and to other chipset components, such as I/O hubs. Like the PCIe standard, QPI specifies data lanes, with each lane comprising four wires, and with data flowing in a single direction on each set of differential wires. However, in contrast to the PCIe standard, QPI specifies DC coupling at the input circuit. QPI interconnects operate as fast as 6.4 Gbps, so a QPI interconnect may transmit data with fundamental clock frequency components from 0 Hz to 3.2 GHz. Often a single computer system will employ both PCIe and QPI interconnects.

BRIEF DESCRIPTION OF THE DRAWINGS

The Figures depict examples, implementations, and configurations.

DETAILED DESCRIPTION

In the foregoing description, numerous details are set forth to provide an understanding of the examples. However, it will be understood by those skilled in the art that the examples may be practiced without these details. While a limited number of examples have been disclosed, those skilled in the art will appreciate numerous modifications and variations therefrom.

Examples relate to differential input circuits capable of supporting AC coupling and the frequency response characteristics of DC coupling.

Figure 1:
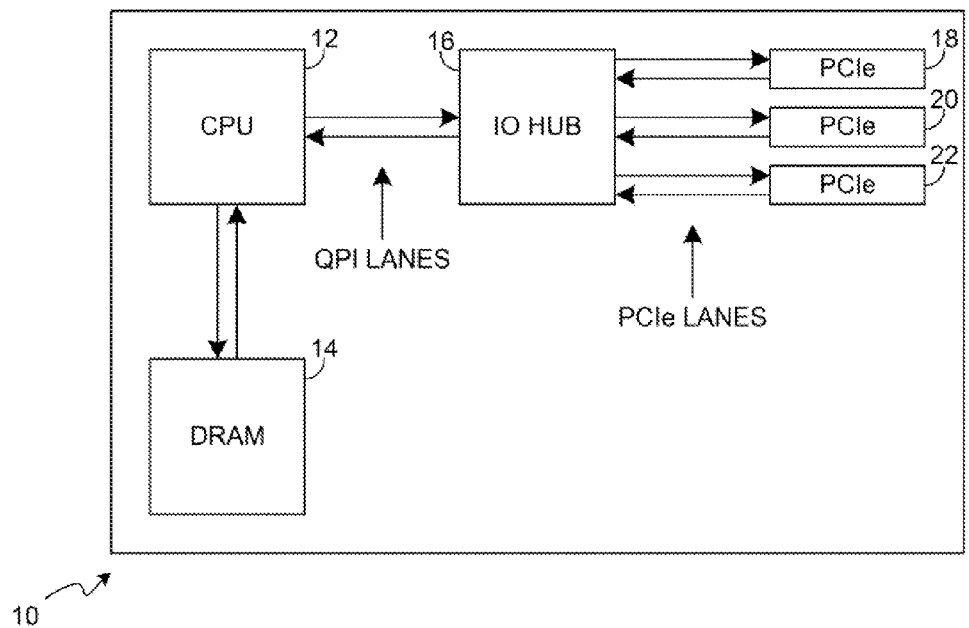
FIG. 1 is a block diagram of a computer system that uses differential signaling to carry data using standards that specify both AC coupling and DC coupling.

FIG. 1 is a block diagram of a computer system 10 using differential signaling to carry data using standards that specify both AC coupling and DC coupling. Computer system 10 includes central processing unit (CPU) 12, dynamic random access memory (DRAM) 14, IO hub 16, and PCIe slots 18, 20, and 22. Note that the block diagram of computer system 10 is simplified, and a typical computer system would include many other components known in the art, such as persistent storage, user input and output devices, additional IO ports, and the like. Also, it is common for computer systems to have multiple CPUs.

As discussed in the Background section above, QPI interconnects are used to couple CPUs to each other, and to chipset components. Accordingly, CPU 12 is coupled to IO hub 16 via QPI lanes that comprise sets of conductors carrying differential signals. Similarly, PCIe slots 18, 20, and 22 are coupled to IO hub 16 via PCIe lanes that comprise sets of conductors carrying differential signals. As noted in the Background section, QPI interconnects use DC coupling and PCIe interconnects use AC coupling, so 10 huh 16 must support differential signaling using both types of coupling.

It is desirable to use a unified input circuit design for interconnects requiring AC coupling and interconnects requiring DC coupling. Engineering resources can be conserved by using a common design, and a common design reduces routing and design verification complexity. Furthermore, it may be desirable to provide differential inputs in an IC that is used in different mainboard designs, with individual differential inputs capable of operating in either AC or DC coupling modes. For example, the differential inputs of an IC used to couple together several CPUs using QPI in one mainboard design might be used to provide additional PCIe interconnects in another mainboard design. In various CPU designs, it may be desirable to provide multi-function lanes that can be configured for different roles. For example, a CPU could have data lanes that could be configured for QPI interconnects to other CPUs or chipset components, or could be configured to support expansion slots using PCIe interconnects.

Although QPI and PCIe are used herein as examples requiring DC coupling and AC coupling, respectively, those skilled in the art will appreciate that the examples disclosed herein can be used in other applications where it is desirable to have differential inputs support both DC and AC coupling.

Figure 2:
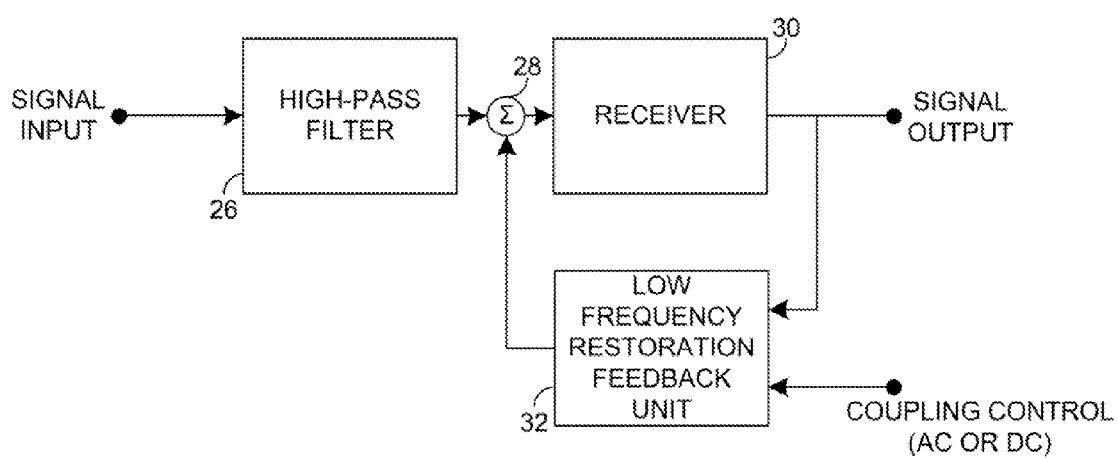
FIG. 2 is a block diagram showing an input circuit.

FIG. 2 is a block diagram showing an input circuit 24. Input circuit 24 receives a signal input at high-pass filter 26, and an output of high-pass filter 26 is coupled to summing node 28. Summing node 28 is coupled to an input of receiver 30, and an output of receiver 30 provides the signal output of input circuit 24. The output of receiver 30 is also provided to an input of low frequency restoration feedback unit 32. Unit 32 also receives a coupling control signal that indicates whether AC or DC coupling should be used. An output of unit 32 is provided summing node 28.

In operation, if the coupling control signal indicates that. AC coupling should be used, unit 32 does not feedback the output of receiver 30 to summing node 28, and circuit 24 provides AC coupling, with only high frequency components of the input signal propagating through high-pass filter 26 to receiver 30.

If the coupling control signal indicates that DC coupling should be used, high frequency components of a transition in the signal input pass through high-pass filter 26 to receiver 30 via summing node 28. The transition is detected by receiver 30, and the transition propagates through unit 32 to summing node 28. As will be seen in greater detail below, in one example unit 32 has a frequency response that approximately mirrors and complements the frequency response of high-pass filter 26.

Consider an input signal having a frequency well below the cutoff frequency of high-pass filter 26. After a transition, in the signal input, the output of high-pass filter 26 will decay. However, as the output of high-pass filter 26 decays, the output of unit 32 will ramp up to compensate for the decay, producing a relatively steady input at receiver 30. Assuming that there are no transitions in the signal input for a sufficient length of time, input circuit 24 will reach a steady state in which the DC signal component of the signal input will be latched by the feedback loop from receiver 30 through unit 32 and summing node 28 back to receiver 30. The operation of input circuit 24 may be understood in greater detail with reference to the discussion of the example shown in FIGS. 3 and 4 below.

Figure 3:
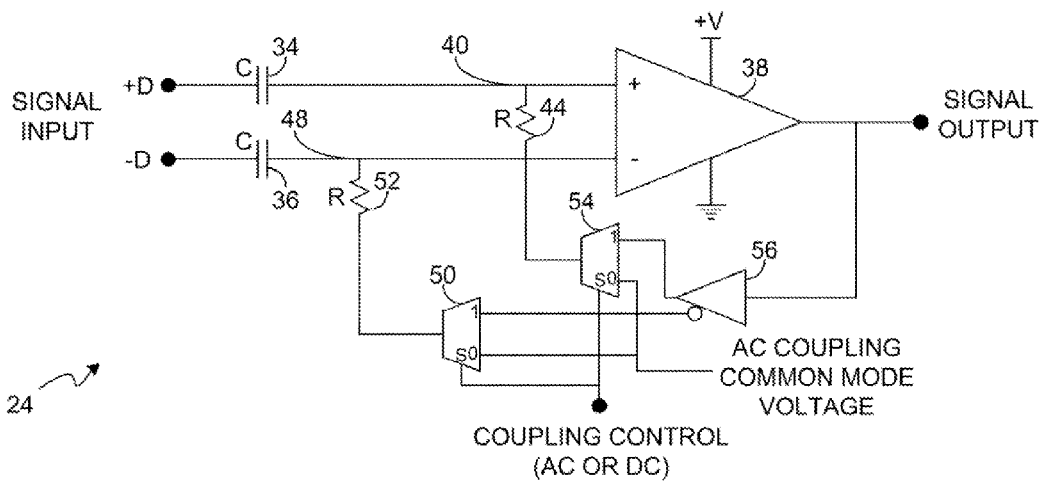
FIG. 3 shows one implementation of the input circuit shown in FIG. 2.

FIG. 3 shows one implementation of input circuit 24 of FIG. 2. In FIG. 3, conductors that meet at a "T" intersection are electrically coupled, and conductors that cross are not electrically coupled. Note that differential signals often require termination, which is not shown in FIG. 3.

In FIG. 3, a differential input signal is supplied to terminals +D and −D. The +D signal is coupled to capacitor 34, and the −D signal is coupled to capacitor 36. Each capacitor has a capacitance C. Capacitor 34 is coupled to the non-inverting input of differential receiver 38, and capacitor 36 is coupled to the inverting input of differential receiver 38.

The output of differential receiver 38 provides the signal output of input circuit 24. The output of differential receiver 38 is also provided to buffer 56, which has inverting and non-inverting outputs. The non-inverting output of buffer 56 is supplied to an input of multiplexor 54, and the inverting output of buffer 56 is supplied to an input of multiplexor 50. Both multiplexors 50 and 54 also have an input attached to an AC coupling common mode voltage, such as +0.5V. Both multiplexors 50 and 54 also have a select input driving by a coupling control signal, which is low for AC coupling and high for DC coupling.

When the coupling control signal is low and AC coupling is selected, multiplexors 50 and 54 route the AC coupling common mode voltage to nodes 48 and 40, respectively. Accordingly, there is no feedback from the output of receiver 38 back to the inputs of receiver 38. When the coupling control signal is high and DC coupling is selected, the non-inverting output of buffer 56 drives node 40 via multiplexor 54 and resistor 44, and the inverting output of buffer 56 drives node 48 via multiplexor 50 and resistor 52, thereby creating a feedback loop that restores the low frequency logic components of the signal input.

For equal values of C and equal values of R, note that the RC constant at the +D and −D inputs of circuit 24 is RC. Also, note that the RC constant for each output of buffer 56 through multiplexors 50 and 54 is RC. The equal RC constants allow the decay in the signal input to be compensated by outputs of buffer 56 through multiplexors 50 and 54, as will be discussed in greater detail below.

In one example, during DC coupling mode the voltage +V is the high voltage provided at the outputs of differential receiver 38, buffer 56, and multiplexors 50 and 54, the low voltage is ground, and the magnitude of the voltage swing at each input +D and −D approximately equal to the magnitude of +V. In a steady state for which there has been no transition at the signal input for a sufficiently long period of time and the output of receiver 38 is +V, the non-inverting output of buffer 56 will also be at +V and the output of multiplexor 54 will be at +V, and therefore the non-inverting input of receiver 38 will be at +V. The inverting output of buffer 56 and the output of multiplexor 50 will be at ground potential, thereby causing the inverting input of receiver 38 to be held at ground potential. Accordingly, the feedback loop through buffer 56 and multiplexors 50 and 54 will maintain a +V differential voltage at the inputs of differential receiver 38.

Similarly, consider a steady state for which there has been no transition at the signal input for a sufficiently long period of time and the output of receiver 38 is at ground potential. The non-inverting output of buffer 56 and the output of multiplexor 54 will also be at ground potential, and therefore the non-inverting input of receiver 38 will be at ground potential. The inverting output of buffer 56 and the output of multiplexor 50 will be at +V, thereby causing the inverting input of receiver 38 to be held at +V. Accordingly, the feedback loop through buffer 56 and multiplexors 50 and 54 will maintain a −V differential voltage at the inputs of differential receiver 38.

Note that input circuit 24 will synchronize after a single transition. Also note that the common mode voltage level is not propagated from the signal input at input +D and −D to the inputs of receiver 38, even though a DC logic level is restored via buffer 56. Also note that high-pass filter 26 and low frequency restoration feedback unit 32 in FIG. 2 share common RC networks in FIG. 3, and summing node 28 in FIG. 2 is implemented at nodes 40 and 48 in FIG. 3. Those skilled in the art will recognize that other circuit configurations may be used to selectively switch between AC and DC coupling.

Figure 4:
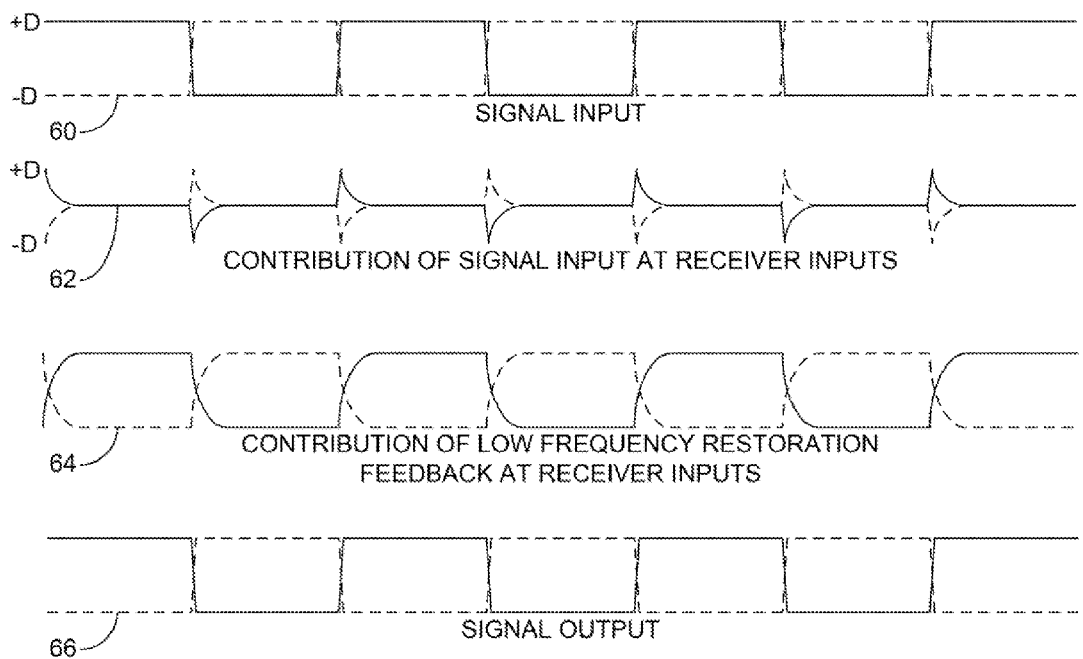
FIG. 4 shows a series of timing diagrams that illustrate how various examples function when the input circuit of FIGS. 2 and 3 is in AC coupling mode.

FIG. 4 shows a series of timing diagrams 58 illustrating how input circuit 24 operates in AC coupling mode. Timing diagram 60 shows an input signal having a frequency approximately live times slower than the cutoff frequency defined by the RC networks shown in FIG. 3. Timing diagram 60 shows the signals at the +D and −D inputs.

Timing diagram 62 conceptually shows the contributions of the signal inputs +D and −D after AC coupling via capacitors 34 and 36 in FIG. 3 without showing the contributions of feedback. In FIG. 2, timing diagram 62 represents the signals from high-pass filter 26 entering summing node 28. Note that the signals in timing diagram 62 spike with the transitions in timing diagram 60, and then the spikes decay to a steady common mode voltage as charge flows to and from capacitors 34 and 36 through the resistors 44 and 52, respectively. The signals in timing diagram 62 remain at the common mode voltage until the next transition.

Timing diagram 64 conceptually shows the contributions of the low frequency restoration feedback at the receiver inputs. In FIG. 2, timing diagram 64 represents the output of low frequency restoration feedback unit 32 to summing mode 28. The spikes shown in timing diagram 62 cause transitions in the output of differential receiver 38 in FIG. 3, which in turn causes transitions in the outputs of buffer 56 and multiplexors 50 and 54. Since charge must flow from buffer 56 to and from capacitors 34 and 36 through the resistors 44 and 52 and multiplexors 54 and 50, respectively, timing diagram 64 shows how the contributions from the low frequency restoration feedback loop transition to the new logic levels with the same RC constant at which contribution from the signal input decays. In essence, the signal shown in timing diagram 64 represents the low frequency components that were removed from the signal of timing diagram 60 to create the signal of timing diagram 62. When the two signal contributions shown in timing diagrams 62 and 64 are combined, the result is the signal output as shown in timing diagram 66. Note that in DC coupling mode, the logic levels of the signal output track the logic levels of the signal input from DC up to the maximum frequency supported by input circuit 24, while the common mode voltages can vary due to AC coupling via capacitors 34 and 36.

Figure 5:
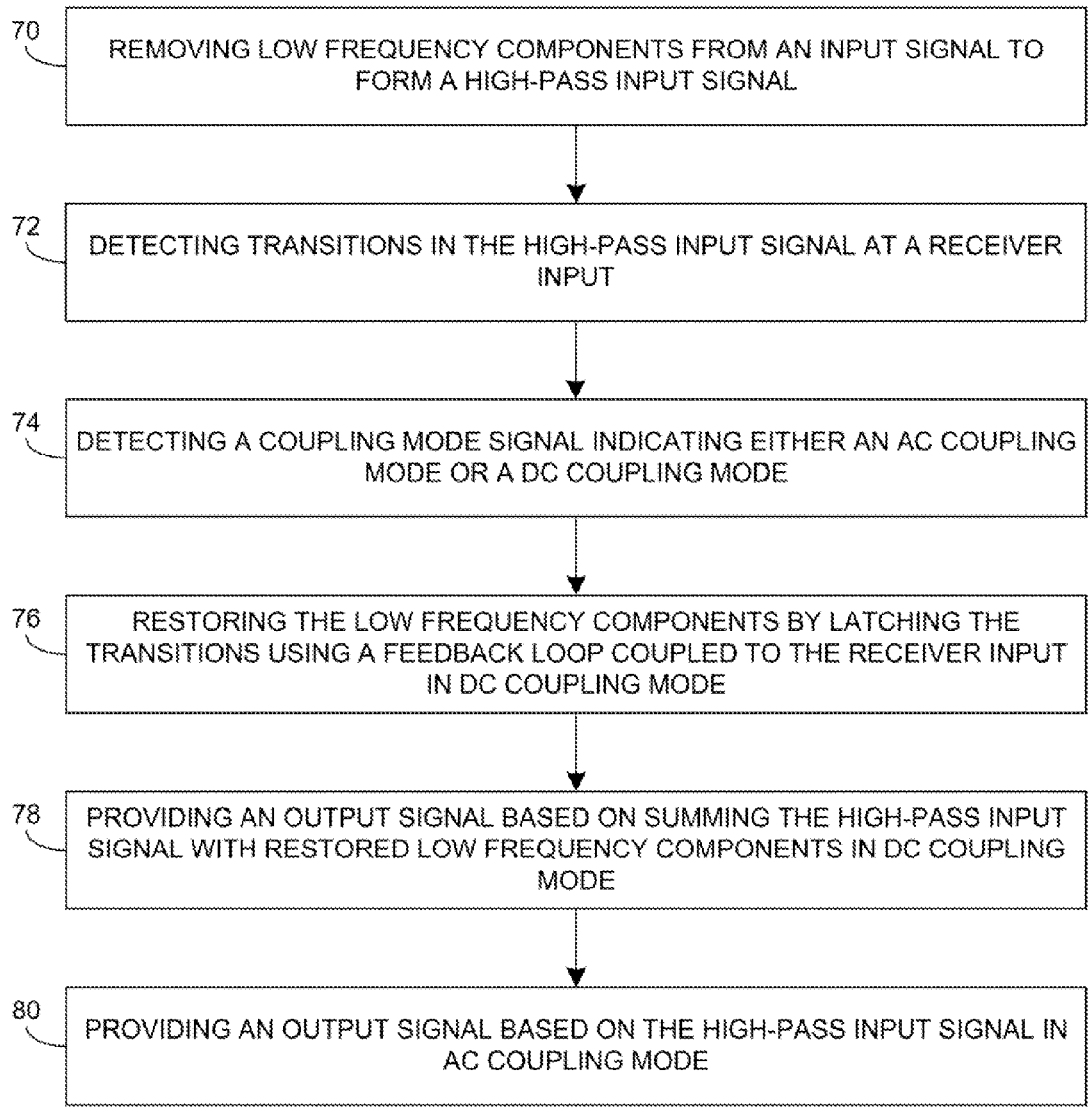
FIG. 5 is a flow chart that illustrates an example method

FIG. 5 is a flow chart 68 that illustrates an example method. The method begins at block 70, where low frequency components are removed from an input signal to form a high-pass input signal. Control passes to block 72.

At block 72, transitions in the high-pass input signal are detected at a receiver input, and control passes to block 74. Block 74 detects whether the coupling mode signal indicates an AC coupling mode or a DC coupling mode, and control passes to block 76. At block 76, if the mode is DC coupling mode, the low frequency components are restored by latching the transitions using a feedback loop coupled to the receiver input, and control passes to block 78.

At block 78, an output signal is provided in DC coupling mode by summing the high-pass input signal with the restored low frequency components. Control passes to block 80. At block 80, and output signal is provided in AC coupling mode based in the high-pass input signal.

Examples disclosed herein provide an input circuit that can operate in an AC coupling mode and a DC coupling mode. Providing an input circuit that can operate in both modes conserves engineering resources and simplifies designs. Furthermore, a dual mode input circuit can support different standards at the same differential input. For example, a differential input may be configured for use with a PCIe interconnect or a QPI interconnect, providing a designer with additional flexibility and configuration options.

In the foregoing description, numerous details are set forth to provide an understanding of the examples. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the true spirit and scope of the examples.

What is claimed is:

1. An input circuit comprising:
a signal input;
a signal output;
a high-pass filter having an input coupled to the signal input and an output, the high pass filter to remove first low frequency components from an input signal presented at the signal input;
a summing node coupled to the output of the high-pass filter;
a receiver having an input coupled to the summing node and an output coupled to the signal output; and
a low frequency restoration feedback unit having an input coupled to the output of the receiver and an output coupled to the summing node, the low frequency restoration feedback unit to provide second low frequency components to the summing node,
wherein the second low frequency components track the first low frequency components,
wherein the signal input, the input and output of the high-pass filter, the summing node, the input of the receiver, and the output of the low frequency restoration feedback unit all carry differential signals, and
wherein the low frequency restoration feedback unit receives a coupling control signal that indicates whether the input circuit should operate in an AC coupling mode or a DC coupling mode, and the second low frequency components are not provided to the summing node in the AC coupling mode.

2. The input circuit of claim 1 wherein an RC constant of the high-pass filter is approximately equivalent to an RC constant of the low frequency restoration feedback unit.

3. The input circuit of claim 1 wherein the input signal adheres to a QuickPath Interconnect (QPI) protocol.

4. The input circuit of claim 1 wherein the coupling control signal signals the low frequency restoration feedback unit to assume the AC coupling mode, and the input signal adheres to a Peripheral Component Interconnect Express (PCIe) protocol.

5. A computer system comprising:
a CPU;
a chipset component coupled to the CPU via a first data lane comprising a pair of differential signals, wherein DC coupling is required at input circuits coupled to the first data lane; and
an expansion slot coupled to the chipset component via a second data lane comprising a pair of differential signals, wherein AC coupling is required at input circuits coupled to the second data lane;
wherein at least one of the input circuits is a dual mode input circuit comprising:
a signal input;
a signal output;
a high-pass filter having an input coupled to the signal input and an output, for removing first low frequency components from an input signal presented at the signal input;
a summing node coupled to the output of the high-pass filter;
a receiver having an input coupled to the summing node and an output coupled to the signal output; and
a low frequency restoration feedback unit having an input coupled to the output of the receiver, an output coupled to the summing node, and a coupling control signal input that specifies either an AC coupling mode or a DC coupling mode, wherein second low frequency components are provided to the summing node in the DC coupling mode and are not provided in the AC coupling mode, and wherein the second low frequency components track the first low frequency components.

6. The computer system of claim 5 wherein the dual mode input circuit includes an RC constant of the high-pass filter that is approximately equivalent to an RC constant of the low frequency restoration feedback unit in DC coupling mode.

7. The computer system of claim 5 wherein the dual mode input circuit exists in the CPU.

8. The computer system of claim 5 wherein the dual mode input circuit exists in the chipset component.

9. The computer system of claim 5 wherein the first data lane adheres to a QuickPath Interconnect (QPI) protocol.

10. The computer system of claim 5 wherein the second data lane adheres to a Peripheral Component Interconnect Express (PCIe) protocol.

11. A method of receiving an input signal comprising:
removing low frequency components from the input signal to form a high-pass input signal;
detecting transitions in the high-pass input signal at a receiver input;
restoring the low frequency components by latching the transitions using a feedback loop coupled to the receiver input;
providing an output signal based on summing the high-pass input signal with restored low frequency components; and detecting a coupling mode signal indicating either an AC coupling mode or a DC coupling mode,
  wherein low frequency components are only restored in DC coupling mode, and the output signal does not sum the high-pass input signal with the restored low frequency components in AC coupling mode.

12. The method of claim 11 wherein an RC constant used to remove low frequency components is approximately equivalent to an RC constant used to restore low frequency components.

13. The method of claim 11 wherein the input signal and the high-pass input signal are differential signals.

14. The method of claim 11 wherein the input signal adheres to a QuickPath Interconnect (QPI) protocol.

15. The method of claim 11 wherein the input signal adheres to a Peripheral Component Interconnect Express (PCIe) protocol.

* * * * *